Oct. 23, 1956 J. P. WEBER, JR 2,768,242

SOUND REPRODUCING AND RECORDING APPARATUS

Filed Oct. 2, 1951

Inventor:
John P. Weber Jr.
By Robert L. Mickle Atty.

United States Patent Office 2,768,242

Patented Oct. 23, 1956

2,768,242

SOUND REPRODUCING AND RECORDING APPARATUS

John P. Weber, Jr., Chicago, Ill., assignor to Bell & Howell Company, Chicago, Ill., a corporation of Illinois Application October 2, 1951, Serial No. 249,344

13 Claims. (Cl. 179—100.1)

Figures 1, 2:
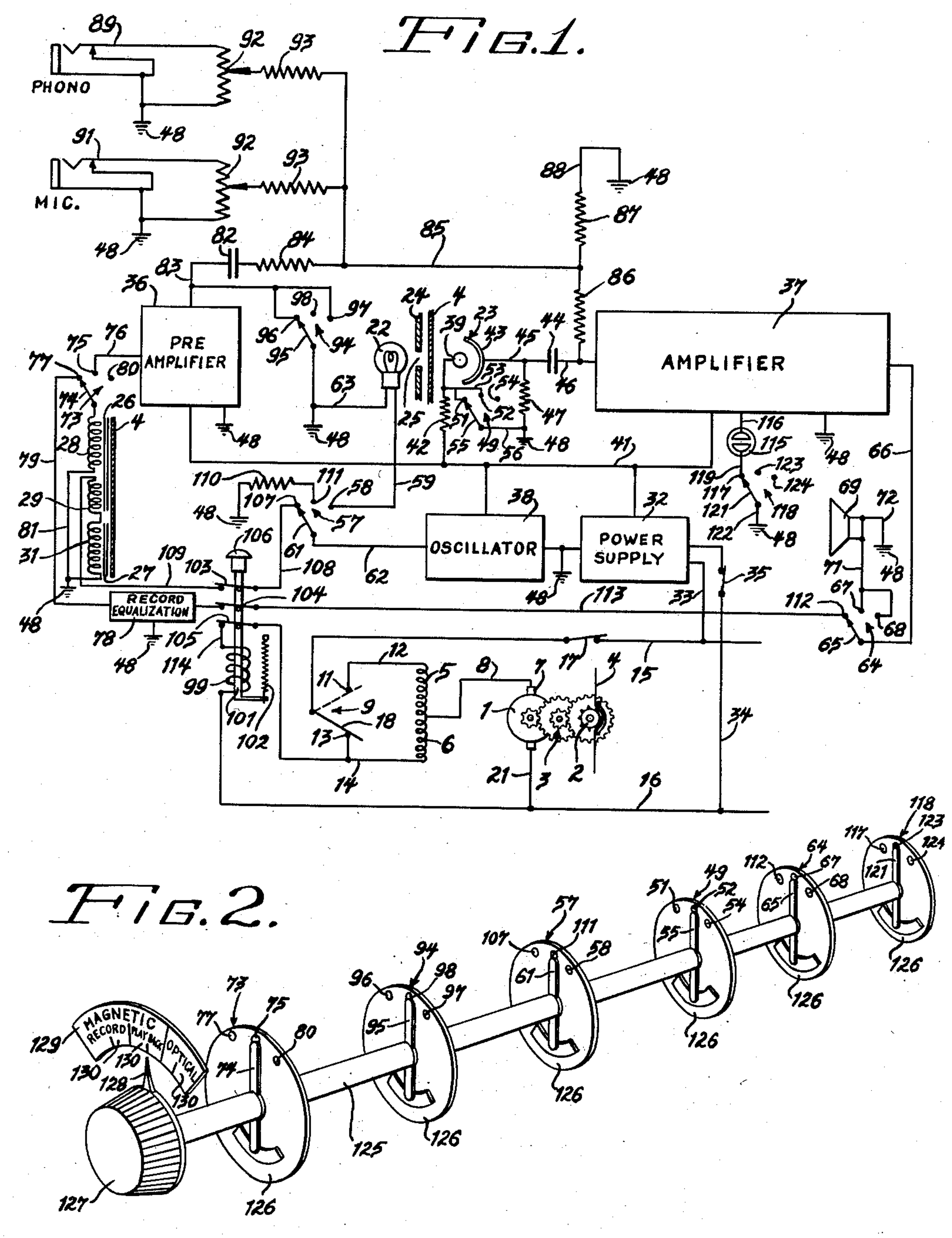

My invention relates particularly to combined optical and magnetic sound reproducing and magnetic sound recording apparatus and more particularly to such apparatus as combined with a motion picture projector for the exhibition of sound accompanied motion pictures and for the magnetic recording of sound on a magnetic sound track on a previously exposed and developed motion picture film.

Objects of the invention reside in the provision of an efficient, desirable and conveniently controlled optical and magnetic sound reproducing and magnetic sound recording apparatus which is adapted to be combined with a motion picture projector for the reproduction of sound accompanied motion pictures and the magnetic recording of sound on a motion picture film provided with a magnetic sound track, which is conveniently changed over for the reproduction of optical or magnetic sound records or for magnetic sound recording, which provides for equalizing the volume of the optical and magnetic sound reproduction, which provides for equalizing the current drain on the supply circuits throughout the several functions of the apparatus, which provides against interference between the optical and magnetic devices of the apparatus, which provides for the energization of the bias and erase coils of the electromagnetic transducer and of the exciter lamp of the opticoelectric transducer from the output of one high frequency oscillator, and which, providing for erasure of a magnetic recording thereon, provides against inadvertent erasure of the recording or superimposing a recording on another.

The invention will be better understood by reference to the accompanying drawing forming a part hereof and in which—

Figure 1 is a schematic diagram showing the electrical circuits and cooperating devices of the apparatus of my invention; and Figure 2 is a perspective view of the multiple change over switch of the apparatus.

Referring to Figure 1, an electric motor 1 drives a rotatable feed sprocket 2 by means of reduction gearing 3 for feeding a sound record strip 4 which is provided with usual feed perforations engaged by the teeth of the sprocket for feeding the strip. Where the apparatus is combined with a motion picture projector for the exhibition of sound accompanied motion pictures, the record strip 4 is in the form of a usual motion picture film strip having thereon a motion picture sequence and a usual sound track which, assuming the apparatus is a combined optical and magnetic sound reproducing apparatus, may be either an optical or magnetic sound track. The drive motor 1 serves to feed the record strip 4 at a constant rate for cooperation of either an optico-electric or electromagnetic transducer with a corresponding sound track on the strip, and where the apparatus is combined with a motion picture projector the drive motor also serves to drive the record strip past the projection aperture of the projector as by means of a usual intermittent film feed mechanism not shown.

The drive motor 1 is of the reversible type for feeding the record strip 4 in either direction for purposes hereinafter appearing, and as shown is of the series wound opposing field coil type, it being provided with opposing field coils 5 and 6 having opposing terminals thereof connected with one commutator brush 7 of the motor by a conductor 8. A double throw switch 9 has one side contact 11 thereof connected with the other terminal of the field coil 5 by a conductor 12, and has the other side contact 13 thereof connected with the other terminal of the field coil 6 by a branch conductor 14.

Lead conductors 15 and 16 are supplied from a suitable source of alternating current, and the lead conductor 15 is inclusive of a motor control switch 17 and is connected with the switch arm 18 of the double throw switch 9. The lead conductor 16 is connected with the other commutator brush 19 of the drive motor by a conductor 21. As so connected the switch 9 serves as a reversing switch for the drive motor, and assuming the motor control switch 17 to be closed, positioning of the switch arm 18 in contact with the side contact 13 effects rotation of the drive motor in the direction in which the record strip 4 is fed for sound reproduction or magnetic recording and for the projection of motion pictures where the sound reproducing on recording apparatus is combined with a motion picture projector, this direction of rotation of the drive motor and feed of the record strip being hereinafter referred to as forwardly. Positioning of the switch arm 18 in contact with the side contact 11 effects rotation of the drive motor and feed of the record strip 4 in the reverse direction, reversal of the direction of feed of the record strip being for the purposes of feeding the record strip backwards preparatory to again feeding the record strip forwardly, and reproducing from a previously reproduced portion of the record strip and in the case of magnetic recording, feeding the record strip backwards preparatory to again feeding the record strip forwardly and erasing a previous recording on the record strip and re-recording thereon.

An opticoelectric transducer comprises an exciter lamp 22, a photoelectric cell 23, and a light slit means 24 forming a light slit 25 between the exciter lamp and the photoelectric cell, as is usual, an optical or photographic sound track on the record strip 4 being fed between the light slit means and the photoelectric cell.

An electromagnetic transducer comprises a reproducing and recording core 26 and an erase core 27 both of paramagnetic material, a reproducing and recording coil 28 and a biasing coil 29 both arranged in cooperative relation with the reproducing and recording core, and an erase coil 31 arranged in cooperative relation with the erase core, as is usual, a magnetic sound track on the record strip 4 being fed past the reproducing and recording core and the erase core in close cooperative relation therewith, feeding of the record strip forwardly as above explained and upwardly in Figure 1 causing the magnetic sound track of the record strip to pass the erase core 27 and then the reproducing and recording core 26.

A power supply 32 of usual construction is energized from the lead conductors 15 and 16 by conductors 33 and 34 respectively connected with the lead conductors, the conductor 34 including a control switch 35. An audio pre-amplifier 36, a main autido amplifier 37, a high frequency oscillator 38 and the anode 39 of the photoelectric cell 23 are each supplied with potential from the power supply 32 as indicated by the branch conductor 41, the anode 39 of the photoelectric cell being supplied with potential from the power supply through a resistance 42.

The cathode 43 of the photoelectric cell 23 is connected with one side of a condenser 44 by a conductor 45, and the other side of this condenser is connected to the input of the main audio amplifier by a conductor 46, and a leak resistance 47 is connected between the conductor 45 and ground 48. A three position switch 49 has two adjacent contacts 51 and 52 thereof connected with the potential source anode circuit 41—42 between the resistance 42 and the anode 39 of the photoelectric cell by a branch conductor 53. The third contact 54 of this switch is unconnected and the switch arm 55 thereof is connected to ground 48 by a conductor 56. When the switch arm 55 is positioned in contact with either of the contacts 51 and 52 a by-pass circuit is completed, which is connected with the potential source anode circuit between the resistance 42 and the anode 39 of the photoelectric cell for by-passing the anode potential and thus rendering the photoelectric cell ineffective to transmit impulses to the input of the main audio amplifier 37, the resistance 42 serving to limit the potential by-passed through the switch 49 so as not to place excessive drain on the power supply 32. When the switch arm 55 is positioned in contact with the unconnected contact 54 the photoelectric cell anode 39 is supplied with potential for the functioning of the photoelectric cell.

A three position switch 57 has one side contact 58 thereof connected with one terminal of the exciter lamp 22 by a conductor 59, and the switch arm 61 of this switch is connected with the output of the high frequency oscillator 38 by a conductor 62. The other terminal of the exciter lamp is connected to ground 48 by a branch conductor 63 so that when the switch arm 61 is positioned in contact with the contact 58 the exciter lamp is energized from the output of the oscillator, the frequency of which, being above the audible range, does not effect the audio frequencies transmitted to the amplifier 37 by the photoelectric cell 23.

A three position switch 64 has its switch arm 65 connected with the output of the main audio amplifier 37 by a conductor 66, and two adjacent contacts 67 and 68 of this switch are connected to one terminal of a speaker 69 by a branch conductor 71, the other terminal of the speaker being connected to ground 48 by a conductor 72. Thus when the switch arm 65 of the switch 64 is positioned in contact with either of the contacts 67 and 68, the speaker 69 is connected with the output of the audio amplifier 37 for the reproduction of audio frequencies therefrom in the form of sound.

Assuming the switch arm 61 of the switch 57 to be positioned in contact with the contact 58 to energize the exciter lamp from the oscillator 38, the switch arm 55 of the switch 49 to be positioned in contact with the contact 54 so that potential is impressed upon the photoelectric cell anode 39 from the power supply 32, and the switch arm 65 of the switch 64 to be positioned in contact with either of the contacts 67 and 68, light from the exciter lamp to the photoelectric cell is varied at audio frequencies by an optical or photographic sound record on the record strip 4 as it is fed past the light slit 25, and these frequencies are converted by the photoelectric cell and impressed on the input of the amplifier 37 in which they are amplified, and after amplification they are impressed on the speaker which reproduces them in the form of sound.

A three position switch 73 has its switch arm 74 connected to one terminal of the reproducing and recording coil 28 of the electromagnetic transducer, and the center contact 75 of this switch is connected with the input of the audio pre-amplifier 36 by a conductor 76. One side contact 77 of this switch is connected with one terminal of a record equalization net work 78 by a conductor 79, and the other side contact 80 of this switch is unconnected. The other terminal of the reproducing and recording coil 28 is connected to ground 48 by a branch conductor 81.

The output of the pre-amplifier 36 is connected with one side of a condenser 82 by a branch conductor 83, and a resistance 84 is connected with the other side of this condenser, and this resistance is connected by a branch conductor 85 between two resistances 86 and 87 of which the resistance 86 is connected with the input of the main audio amplifier 37 and of which the resistance 87 is connected to ground 48 by a conductor 88. Phonograph and microphone jacks 89 and 91 are connected with the branch conductor 85 by potentiometers 92 and resistances 93.

A three position switch 94 has its switch arm 95 connected to ground 48 by the branch conductor 63, and the side contacts 96 and 97 of this switch are connected with the output of the pre-amplifier 36 by the branch conductor 83, and the center contact 98 of this switch is unconnected.

When the switch arm 95 of this switch is positioned in contact with either of the side contacts 96 and 97, the output of the pre-amplifier is by-passed so as not to affect the input of the main audio amplifier 37 when the pre-amplifier is not functioning, and when the switch arm 95 is positioned in contact with the center contact 98 the output of the pre-amplifier is effective on the input of the main amplifier 37.

An electromagnetic relay comprises a relay coil 99, an armature 101 under the control of the relay coil, a spring 102 yieldably urging the armature into one position in opposition to the influence of the relay coil, and three switches 103, 104 and 105 controlled by the armature and which are open when the armature is in said spring urged position thereof and closed when the armature is in the opposite position thereof, the armature being provided with a knob 106 by means of which the armature may be manually operated to said opposite position thereof.

The other side contact 107 of the switch 57 is connected with one terminal of the relay switch 103 by a conductor 108, and the other terminal of the switch 103 is connected with one end of the bias coil 29 of the electromagnetic transducer by a conductor 109. The other end of the bias coil 29 is connected with an end of the erase coil 31 of the electromagnetic transducer, and the other end of the erase coil is connected to ground 48 by the conductor 81.

Assuming the relay switches 103—104—105 to be closed, positioning of the switch arm 61 of the switch 57 in contact with the side conftact 107, connects the output of the oscillator 38 with the bias and erase coils 29 and 31 for erasing a previous recording on a magnetic sound track on the record strip 4 as it is fed past the electromagnetic transducer and conditioning the sound track for recording thereon. A resistance 110 is connected with the center contact 111 of the switch 57 and with ground 48 for by-passing the output of the oscillator when its output is not used either for energizing the exciter lamp or bias and erase coils, as where a record on a magnetic sound track on the record strip 4 is being reproduced, the resistance 110 placing a normal drain on the oscillator output.

The other side contact 112 of the switch 64 is connected with one terminal of the relay switch 104 by a conductor 113, and the other terminal of the switch 104 is connected with the other terminal of the record equalization net work 78, so that assuming the relay switches 104—104—105 to be closed, the switch arm 65 of the switch 64 to be positioned in contact with the contact 112 and the switch arm 74 of the switch 73 to be positioned in contact with the contact 77, the output of the main audio amplifier is connected with the reproducing and recording coil 28 for magnetic recording.

One terminal of the relay switch 105 is connected with the side contact 13 of the reversing switch 9 by the conductor 14, and the other terminal of this relay switch is connected with one end of the relay coil 99 by a conductor 114. The other end of the relay coil is connected with the lead conductor 16.

A neon lamp 115 has one terminal thereof connected by a conductor 116 with a signal affected circuit of the main amplifier 37, such as the anode circuit of one of the power amplifier tubes of the amplifier, and has its other terminal connected with a side contact 117 of a three position switch 118 by a conductor 119. The switch arm 121 of this switch is connected to ground 48 by a conductor 122, and the other contacts 123 and 124 of this switch are unconnected.

Referring to Figure 2, a pivotally mounted switch shaft 125 has the switch arms 55, 61, 65, 74, 95 and 121 of the change over switches 49, 57, 64, 73, 94 and 118 secured thereon in spaced relation longitudinally thereof, they being insulated from each other in a suitable manner. The contacts of these switches are respectively mounted on stationary disks 126 of insulating material spaced along the shaft for selective contact of the switch arms with the respective contacts with pivotal adjustment of the shaft. The shaft is provided with a knob 127 for manually positioning the shaft and with a pointer 128 which cooperates with a stationary index plate 129 having thereon indications 130 to indicate the several positions of the switch arms for magnetic recording, magnetic reproduction (playback) and optical reproduction.

The switch arms and their respective contacts are arranged so that in the magnetic recording position of the switch shaft, the switch arms 55, 61, 65, 74, 95 and 121 respectively contact the contacts 51, 107, 112, 77, 96 and 117 as shown in Figure 1, and in the magnetic reproducing position the contacts 52, 111, 67, 75, 98 and 123 as shown in Figure 2, and in the optical reproducing position the contacts 54, 58, 68, 80, 97 and 124.

The common control of the change over switches 49, 57, 64, 73, 94 and 118 provides for conveniently changing over the apparatus for magnetic recording or reproduction or optical reproduction, and except in the case of magnetic recording as hereinafter explained, it is only necessary to position the switch shaft 125 for the desired function.

When it is desired to magnetically record, in addition to positioning the change over switches as shown in Figure 1, it is necessary that the relay switches 103, 104 and 105 be closed as is also shown in Figure 1, and in magnetic recording, audio frequencies from an electrical sound pickup connected to one of the jacks 89 and 91 are impressed on the input of the main audio amplifier 37, and after being amplified thereby, they are impressed on the reproducing and recording coil 28 through the switch arm 65 and contact 112 of the change over switch 64, the switch 104, the record equalizing net work 78, and the contact 77 and switch arm 74 of the change over switch 73 for recording on a magnetic sound track on the record strip 4 as it is fed upwardly past the electromagnetic transducer. During magnetic recording the oscillator 38 is connected with the bias coil 29 and erase coil 31 to erase any previous record on the sound track and to place the sound track in proper condition for recording thereon. Also during magnetic recording the output of the pre-amplifier 36 is by-passed by the switch arm 95 of the switch 94 contacting the contact 96 so that any chance frequencies from the pre-amplifier cannot affect the recording, the exciter lamp 22 is deenergized by the switch arm 61 of the switch 57 being out of contact with the contact 58, the potential to the anode 39 of the photoelectric cell 23 is by-passed by the switch arm 55 of the switch 49 contacting the contact 51 so that the photoelectric cell cannot affect the recording, and the circuit of the neon lamp 115 is completed by the switch arm 121 of the switch 118 contacting the contact 117 so that the lamp functions as a volume level indicator during recording.

When it is desired to reproduce from a record on a magnetic sound track of the record strip 4, the switch shaft 125 is positioned as shown in Figure 2 in which position the switch arm 74 of the switch 73 contacts the contact 75 to connect the reproducing and recording coil 28 to the input of the pre-amplifier 36, the switch arm 95 of the switch 94 contacts the contact 98 so that the pre-amplifier output is not by-passed and is impressed on the input of the main amplifier 37, the switch arm 65 of the switch 64 contacts the contact 67 so that the main amplifier output is impressed on the speaker 69, the switch arm 61 of the switch 57 contacts the contact 111 so that the output of the oscillator 38 is by-passed through the resistance 110 and the bias and erase coils 29 and 31 and the exciter lamper 22 are not energized, the switch arm 55 of the switch 49 contacts the contact 52 so that the potential to the anode 39 of the photoelectric cell 23 is by-passed and the photoelectric cell cannot affect the magnetic reproduction, and the switch arm 121 of the switch 118 contacts the contact 123 so that the circuit of the lamp 115 is open.

When it is desired to reproduce from a record on an optical or photographic sound track of the record strip 4, the switch shaft 125 is positioned so that the switch arms 55, 61, 65, 74, 95 and 121 respectively contact the contacts 54, 58, 68, 80, 97 and 124, the reproducing and recording coil 28 being disconnected from the input of the pre-amplifier 36, the output of the pre-amplifier is by-passed, the exciter lamp 22 is energized by the output of the oscillator 38, potential from the power supply 32 is impressed on the anode 39 of the photoelectric cell, so that light from the exciter lamp and varied by the optical sound on the record strip 4 is impressed on the photoelectric cell 23 which converts and impresses the resulting frequencies on the input of the main amplifier 37, the main amplifier output is impressed on the speaker 69, and the circuit of the lamp 115 is open.

The relay coil 99 when sufficiently energized, serves to hold the armature 101 in position closing the switches 103, 104 and 105. The relay switch 105 is in series with the relay coil 99 and with the motor control switch 17 and the switch arm 18 and contact 13 of the reversing switch 9, the switch arm contacting this contact when the record strip is being fed forwardly or in the direction for reproducing and recording. Assuming the circuit to the drive motor to be open, the relay coil is deenergized and the spring 102 positions the armature 101 in the position in which the switches 103, 104 and 105 are open. Subsequent energization of the drive motor does not energize the relay coil because the switch 105 is open and the switches 103 and 104 being also open, the output of the main amplifier 37 is disconnected from the reproducing and recording coil 29 and the output of the oscillator 38 is disconnected from the bias and erase coils 29 and 31.

Consequently, these coils cannot be energized even though the change over switch arms are placed in magnetic recording position, and it is only when the armature 101 is manually moved to close the switches 103, 104 and 105 that the electromagnetic transducer can be energized, the relay coil being energized by closure of the switch 105 to retain the armature in switch closing position providing the drive motor is energized to drive the record strip forwardly. When the drive motor is deenergized the relay coil is also deenergized whereupon the spring 102 returns the armature to open switch position. When the drive motor is energized to drive the record strip in the reverse direction by the switch arm 18 of the reversing switch contacting the contact 11, the resistance of the motor field coils 5 and 6 which are then in series with the relay coil 99, prevents the relay coil from becoming sufficiently energized to retain the armature 101 in switch closing position. Thus the possibility of inadvertently erasing or superimposing a magnetic record on another is minimized.

While I have thus described my invention, I do not wish to be limited to the precise details described, as changes may be readily made without departing from the spirit of my invention, but having thus described my invention, I claim as new and desire to secure by Letters Patent the following:

1. In a combined optical and magnetic sound reproducing apparatus, the combination of opticoelectric and electromagnetic transducers respectively cooperative with fed optical and magnetic sound record members, said opticoelectric transducer comprising an exciter lamp, an audio amplifier, a speaker connected with the output of said amplifier, a high frequency oscillator circuit means for connecting said transducers with the input of said amplifier for reproduction through either of said transducers, circuit means for connecting the output of said oscillator with said exciter lamp, and control means for alternately rendering said electromagnetic transducer and oscillator effective respectively on said amplifier input and exciter lamp.

2. In a combined optical and magnetic sound reproducing apparatus, the combination of claim 1 and further characterized in that there is included by-pass circuit means comprising a resistance, and said control means further comprises switch means for alternately connecting said oscillator output with said exciter lamp and by-pass circuit means.

3. In a combined optical and magnetic sound reproducing apparatus, the combination of opticoelectric and electromagnetic transducers respectively cooperative with fed optical and magnetic sound record members, said opticoelectric transducer comprising an exciter lamp and a photoelectric cell, an audio amplifier, a speaker connected with the output of said amplifier, a high frequency oscillator, a source of electrical potential, circuit means for connecting said transducers with the input of said amplifier for reproduction through either of said transducers, circuit means for connecting the output of said oscillator with said exciter lamp, circuit means for connecting said potential source with the anode of said photoelectric cell, and control means for alternately rendering said transducers effective on said amplifier input and comprising means for simultaneously rendering said oscillator and potential source ineffective respectively on said exciter lamp and anode.

4. In a combined optical and magnetic sound reproducing apparatus, the combination of claim 3 and further characterized in that there is included by-pass circuit means comprising a resistance, said potential source anode circuit means comprises a resistance, and said control means comprises by-pass circuit means comprising switch means connected with said potential source anode circuit means between said second mentioned resistance and anode and said control means further comprises switch means for alternately connecting said oscillator output with said exciter lamp and first mentioned by-pass circuit means.

5. In a combined optical and magnetic sound reproducing apparatus, the combination of opticoelectric and electromagnetic transducers respectively cooperative with fed optical and magnetic sound record members, said opticoelectric transducer comprising an exciter lamp and a photoelectric cell, a main audio amplifier, an audio pre-amplifier, a speaker connected with the output of said main amplifier, a high frequency oscillator, a source of electrical potential, circuit means for connecting said electromagnetic transducer with the input of said pre-amplifier, circuit means for connecting said opticoelectric transducer and the output of said pre-amplifier with the input of said main amplifier for reproduction through either of said transducers, circuit means for connecting the output of said oscillator with said exciter lamp, circuit means for connecting said potential source with the anode of said photoelectric cell, and control means for alternately rendering said transducers effective on said main amplifier input and comprising means for simultaneously rendering said pre-amplifier, said oscillator and potential source ineffective respectively on said main amplifier input, said exciter lamp and said anode.

6. In a combined optical and magnetic sound reproducing apparatus, the combination of claim 5 and further characterized in that there is included by-pass circuit means comprising a resistance, said potential source anode circuit means comprises a resistance, and said control means comprises two by-pass circuit means comprising switch means and respectively connected with said potential source anode circuit means between said second mentioned resistance and anode and with said pre-amplifier output and said control means further comprises switch means for alternately connecting said oscillator output with said exciter lamp and first mentioned by-pass circuit means.

7. In a combined optical and magnetic sound reproducing and magnetic sound recording apparatus, the combination of opticoelectric and electromagnetic transducers respectively cooperative with fed optical and magnetic sound record members, said opticoelectric transducer comprising an exciter lamp, an audio amplifier, a speaker, a high frequency oscillator, circuit means for connecting said transducers with the input of said amplifier and said speaker with the output of said amplifier for reproduction through either of said transducers, circuit means for connecting said electromagnetic transducer with said amplifier output and connecting an electrical sound pickup with said amplifier input for magnetic recording, circuit means for connecting the output of said oscillator with said electromagnetic transducer and with said exciter lamp, and control means for alternately connecting said electromagnetic transducer with said amplifier input and output respectively for magnetic reproduction or recording.

8. In a combined optical and magnetic sound reproducing and magnetic sound recording apparatus, the combination of claim 7 and further characterized in that said control means further comprises means for alternately connecting said oscillator output with said electromagnetic transducer and exciter lamp respectively for magnetic recording or optical reproduction.

9. In a combined optical and magnetic sound reproducing and magnetic sound recording apparatus, the combination of claim 7 and further characterized in that said control means further comprises means for alternately connecting said oscillator output with said electromagnetic transducer and exciter lamp respectively for magnetic recording and optical reproduction and for rendering said oscillator output ineffective on both said electromagnetic transducer and exciter lamp for magnetic reproduction.

10. In a combined optical and magnetic sound reproducing and magnetic sound recording apparatus, the combination of claim 7 and further characterized in that there is included bypass circuit means comprising a resistance, and said control means further comprises switch means for alternately connecting said oscillator output with said electromagnetic transducer and exciter lamp respectively for magnetic recording and optical reproduction and for disconnecting said oscillator output from both said electromagnetic transducer and exciter lamp and connecting it to said by-pass circuit means for magnetic reproduction.

11. In a combined optical and magnetic sound reproducing and magnetic sound recording apparatus, the combination of opticoelectric and electromagnetic transducers respectively cooperative with fed optical and magnetic sound record members, said opticoelectric transducer comprising an exciter lamp, a main audio amplifier, an audio pre-amplifier, a speaker, a high frequency oscillator, circuit means for connecting said electromagnetic transducer with the input of said pre-amplifier and said opticoelectric transducer and the output of said pre-amplifier with the input of said main amplifier and said speaker with the output of said main amplifier for reproduction through either of said transducers, circuit means for connecting said electromagnetic transducer with said main amplifier output and connecting an electrical sound pickup with said main amplifier input for magnetic recording, circuit means for connecting the output of said oscillator with said electromagnetic transducer and with said exciter lamp, and control means for alternately connecting said electromagnetic transducer with said pre-amplifier input and said main amplifier output respectively for magnetic reproduction or recording.

12. In a combined optical and magnetic sound reproducing and magnetic sound recording apparatus, the combination of claim 11 and further characterized in that said control means further comprises means for alternately connecting said oscillator output with said electromagnetic transducer and exciter lamp respectively for magnetic recording or optical reproduction.

13. In a combined optical and magnetic sound reproducing and magnetic sound recording apparatus, the combination of claim 11 and further characterized in that said control means further comprises means for alternately connecting said oscillator output with said electromagnetic transducer and exciter lamp respectively for magnetic recording and optical reproduction and for rendering said oscillator output ineffective on both said electromagnetic transducer and exciter lamp for magnetic reproduction.

References Cited in the file of this patent

UNITED STATES PATENTS

| | | |
|---|---|---|
| Re. 20,422 | Pfister | June 22, 1937 |
| 2,096,805 | Hickman | Oct. 26, 1937 |
| 2,519,597 | Owens | Aug. 22, 1950 |
| 2,574,218 | Lynch | Nov. 6, 1951 |

OTHER REFERENCES

Journal of the Society of Motion Picture Engineers, September 1949, vol. 53, pages 217–235.